(12) United States Patent
Kaneda et al.

(10) Patent No.: US 7,689,243 B2
(45) Date of Patent: Mar. 30, 2010

(54) USER GUIDANCE SYSTEM, MOBILE COMMUNICATION TERMINAL, AND USER GUIDANCE METHOD

(75) Inventors: Shigeru Kaneda, Yokohama (JP); Yoshikazu Akinaga, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 777 days.

(21) Appl. No.: 10/586,640

(22) PCT Filed: Mar. 1, 2006

(86) PCT No.: PCT/JP2006/003845
§ 371 (c)(1),
(2), (4) Date: Jul. 19, 2006

(87) PCT Pub. No.: WO2006/093178
PCT Pub. Date: Sep. 8, 2006

(65) Prior Publication Data
US 2008/0227402 A1    Sep. 18, 2008

(30) Foreign Application Priority Data
Mar. 1, 2005    (JP)    ............................. 2005-056493

(51) Int. Cl.
*H04M 1/00* (2006.01)
(52) U.S. Cl. .................. 455/550.1; 455/68; 455/404.2; 455/405; 455/408; 455/414.1; 455/412.1; 455/440; 455/452.1; 455/452.2; 455/418; 455/513; 455/453; 455/450

(58) Field of Classification Search .............. 455/550.1, 455/68, 404.2, 405, 408, 414.1, 412.1, 440, 455/418, 513, 453, 450, 452.2, 452.1
See application file for complete search history.

(56) References Cited

U.S. PATENT DOCUMENTS
6,741,927 B2 *    5/2004    Jones ......................... 701/201
(Continued)

FOREIGN PATENT DOCUMENTS
JP    5 183495    7/1993
(Continued)

OTHER PUBLICATIONS
R. De Silva, et al., "Managing appliation level quality of service through TOMTEN", Apr. 8, 1999, pp. 727-739.

*Primary Examiner*—Duc Nguyen
*Assistant Examiner*—Amar Daglawi
(74) *Attorney, Agent, or Firm*—Oblon, Spivak, McClelland, Maier & Neustadt, L.L.P.

(57) ABSTRACT

A user guidance system includes a communication history receiver receiving communication history information of a mobile communication terminal; a traffic information generator receiving resource state information from a base station and generating communication traffic information at the base station; a dissatisfaction calculator calculating a dissatisfaction with a recommended action to a user of the mobile communication terminal, based on the communication history information and the communication traffic information; a recommended action extractor extracting a recommended action for the user to be notified of, based on dissatisfactions with a plurality of recommended actions; and an information transmitter transmitting the recommended action to the mobile communication terminal.

19 Claims, 6 Drawing Sheets

U.S. PATENT DOCUMENTS

| | | | |
|---|---|---|---|
| 6,859,722 B2 * | 2/2005 | Jones | 701/200 |
| 7,015,817 B2 * | 3/2006 | Copley et al. | 340/573.4 |
| 7,113,110 B2 * | 9/2006 | Horstemeyer | 340/994 |
| 7,172,118 B2 * | 2/2007 | Urken | 235/386 |
| 2004/0015690 A1 * | 1/2004 | Torigai et al. | 713/156 |
| 2005/0003804 A1 * | 1/2005 | Huomo et al. | 455/414.1 |
| 2005/0067493 A1 * | 3/2005 | Urken | 235/386 |
| 2005/0144049 A1 * | 6/2005 | Kuzunuki et al. | 705/6 |
| 2006/0149905 A1 * | 7/2006 | Park et al. | 711/141 |
| 2006/0212561 A1 * | 9/2006 | Feng | 709/223 |
| 2006/0276962 A1 * | 12/2006 | Yoshioka et al. | 701/208 |
| 2007/0023515 A1 * | 2/2007 | Urken | 235/386 |
| 2007/0037582 A1 * | 2/2007 | Mohi et al. | 455/456.1 |
| 2007/0037587 A1 * | 2/2007 | Mohi et al. | 455/456.5 |
| 2007/0037588 A1 * | 2/2007 | Mohi et al. | 455/456.5 |
| 2007/0042790 A1 * | 2/2007 | Mohi et al. | 455/456.5 |
| 2007/0124144 A1 * | 5/2007 | Johnson | 704/246 |
| 2007/0233839 A1 * | 10/2007 | Gaos | 709/223 |

FOREIGN PATENT DOCUMENTS

| | | |
|---|---|---|
| JP | 5 191856 | 7/1993 |
| JP | 2001-144854 | 5/2001 |
| JP | 2002 521990 | 7/2002 |
| JP | 2003 196284 | 7/2003 |
| WO | WO 2004/047476 | 6/2004 |

* cited by examiner

Fig.2

| USER ID | ORIGINATING TIME | ORIGINATING-TIMES STATE | ORIGINATING-TIME PLACE | TERMINATING TIME | TERMINATING-TIME STATE | TERMINATING-TIME PLACE | COMMUNICATION MEANS | INFORMATION CONTENT OF RECOMMENDED ACTION |
|---|---|---|---|---|---|---|---|---|
| 0000001 | 200501171402 | OK | AREA002 | 200501171406 | NG | AREA001 | PHONE | NONE |
| 0000002 | 200510202143 | NG | AREA003 | - | - | - | MAIL | WAITING FOR 90 SECONDS |
| .. | | | | | | | | |

*Fig.3*

| USER GROUP ID | USER ID | COEFFICIENT a | COEFFICIENT b | COEFFICIENT c | COEFFICIENT d | COEFFICIENT e | COEFFICIENT f |
|---|---|---|---|---|---|---|---|
| 0001 | 0000001;00000003 | 100 | 100 | 10 | 1 | 1 | 10 |
| 0002 | 0000002 | 200 | 300 | 10 | 1 | 1 | 10 |
| 0003 | 0000004;0000005 | 300 | 200 | 20 | 1 | 1 | 5 |
| .. | .. | .. | .. | .. | .. | .. | .. |

Fig.4

| RECOMMENDED ACTION | PARAMETER X |
|---|---|
| MOVEMENT TO AROUND X | STATION ○; STATION △; TOWER □;... |
| WAITING FOR TIME X | 10 SEC; 30 SEC; 60 SEC; 90 SEC; 120 SEC;... |
| CHANGE OF COMMUNICATION MEANS TO X | PHONE; MAIL;... |
| ... | ... |

USER GUIDANCE SYSTEM, MOBILE COMMUNICATION TERMINAL, AND USER GUIDANCE METHOD

TECHNICAL FIELD

The present invention relates to a user guidance system, mobile communication terminal, and user guidance method for guiding user's action during utilization of communication.

BACKGROUND ART

In a mobile communication system locations of user terminals vary constantly and communication requests could be locally concentrated depending upon conditions. Under such circumstances, communication resources such as wireless resources could become insufficient in the mobile communication system, so as to increase cases of rejecting a communication request. A known means for handling such cases is a communication terminal configured to collect the dynamically varying state of the communication system from a base station and to set a parameter to be designated during communication, to a suitable value (cf. Patent Document 1 below).

Patent Document 1: Published Japanese translation of PCT application Publication No. P2002-521990A

DISCLOSURE OF THE INVENTION

Problem to be Solved by the Invention

However, the above communication terminal fails to provide each user with useful information because a variety of state information of the communication system, such as the performance of the communication network and a charge table, is received through broadcasting. Since there are a diversity of actions that can be taken by a user, it is difficult to effectively utilize the communication resources and to guide the user to an action suitable for the user by simply changing the communication parameter on the basis of such state information.

The present invention has been accomplished in view of the above problem and an object of the present invention is to provide a user guidance system, mobile communication terminal, and user guidance method capable of guiding a user to an appropriate action during utilization of communication.

Means for Solving the Problem

In order to solve the above problem, a user guidance system according to the present invention is a user guidance system comprising: communication history receiving means for receiving communication history information which is history information of communication of a mobile communication terminal in a communication network; traffic information generating means for receiving from a base station in the communication network, resource state information indicating a usage state of resources of the base station and for generating communication traffic information about a communication traffic at the base station, using the resource state information and the communication history information; dissatisfaction calculating means for calculating a dissatisfaction with a recommended action being an action recommended to a user of the mobile communication terminal, based on the communication history information received by the communication history receiving means and the communication traffic information generated by the traffic information generating means; recommended action extracting means for, based on dissatisfactions with a plurality of recommended actions calculated by the dissatisfaction calculating means, extracting a recommended action for the user to be notified of, out of the plurality of recommended actions; and information transmitting means for transmitting the recommended action extracted by the recommended action extracting means, to the mobile communication terminal.

In another aspect, a mobile communication terminal according to the present invention is a mobile communication terminal comprising: communication history receiving means for receiving communication history information being history information of communication in a communication network; traffic information generating means for receiving from a base station in the communication network, resource state information indicating a usage state of resources of the base station and for generating communication traffic information about a communication traffic at the base station, using the resource state information and the communication history information; dissatisfaction calculating means for calculating a dissatisfaction with a recommended action being an action recommended to a user, based on the communication history information received by the communication history receiving means and the communication traffic information generated by the traffic information generating means; recommended action extracting means for, based on dissatisfactions with a plurality of recommended actions calculated by the dissatisfaction calculating means, extracting a recommended action for the user to be notified of, out of the plurality of recommended actions; and outputting means for outputting the recommended action extracted by the recommended action extracting means.

In still another aspect, a user guidance method according to the present invention is a user guidance method comprising: a communication history receiving step wherein communication history receiving means receives communication history information being history information of communication in a communication network; a traffic information generating step wherein traffic information generating means receives from a base station in the communication network, resource state information indicating a usage state of resources of the base station and generates communication traffic information about a communication traffic at the base station, using the resource state information and the communication history information; a dissatisfaction calculating step wherein dissatisfaction calculating means calculates a dissatisfaction with a recommended action being an action recommended to a user, based on the communication history information received by the communication history receiving means and the communication traffic information generated by the traffic information generating means; and a recommended action extracting step wherein, based on dissatisfactions with a plurality of recommended actions calculated by the dissatisfaction calculating means, recommended action extracting means extracts a recommended action for the user to be notified of, out of the plurality of recommended actions.

The user guidance system, mobile communication terminal, and user guidance method are arranged to receive the communication history of the mobile communication terminal and the usage state of resources of the base station, to generate the information about the communication traffic at the base station from these information pieces, and to calculate the dissatisfactions with the plurality of actions to be recommended to the user, based on the communication history, the usage state of the resources of the base station, and the communication traffic at the base station. Since a recommended action suitable for the user is extracted from the plurality of actions, based on the dissatisfactions thus calculated, and the user is notified of the extracted action, the recommended action suitable for the user can be selected well out of a plurality of candidates, in consideration of the traffic state at each base station and the user's communication state.

EFFECT OF THE INVENTION

The present invention successfully provides the user guidance system for guiding a user to an appropriate action during utilization of communication.

BRIEF DESCRIPTION OF THE DRAWINGS

FIG. 2 is a diagram showing an example of a data configuration of a communication history storage 108 in FIG. 1.

FIG. 3 is a diagram showing an example of a data configuration of a dissatisfaction function storage in FIG. 1.

FIG. 4 is a diagram showing an example of a data configuration of a recommended action storage in FIG. 1.

DESCRIPTION OF REFERENCE SYMBOLS 1 user guidance system; 2, 11 mobile communication terminals; 3 base station; 5 communication network; 101 communication history receiver (communication history receiving means); 102 traffic information generator (traffic information generating means); 103 dissatisfaction calculator (dissatisfaction calculating means); 104 recommended action extractor (recommended action extracting means); 105 information transmitter (information transmitting means); 106 action specifier (action specifying means); 107 function resetter (function resetting means); 111 communication controller (communication controlling means); 112 output unit (outputting means).

BEST MODE FOR CARRYING OUT THE INVENTION

A preferred embodiment of the user guidance system according to the present invention will be described below in detail with reference to the drawings. In the description of the drawings the same elements will be denoted by the same reference symbols, without redundant description.

Figure 1:
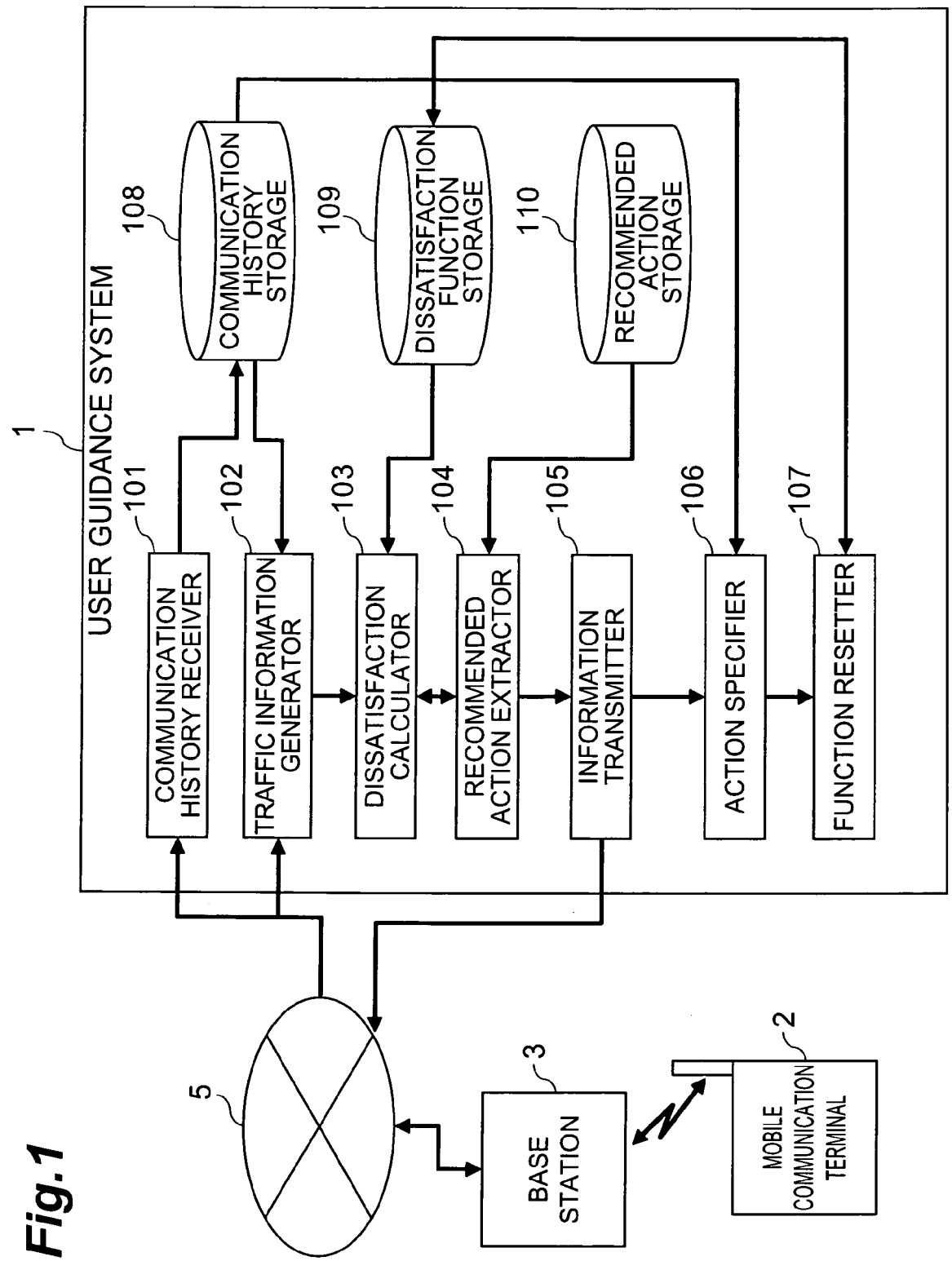
FIG. 1 is a schematic configuration diagram showing a preferred embodiment of the user guidance system according to the present invention.

FIG. 1 is a schematic configuration diagram showing a preferred embodiment of the user guidance system according to the present invention. The user guidance system 1 shown in the same drawing is a server system (or an aggregate of server systems) for sending information about a recommended action during utilization of communication to each of users of mobile communication terminals, and is constructed so as to be able to transmit and receive information to and from a mobile communication terminal 2 via a communication network 5 and a plurality of base stations including a base station 3.

The user guidance system 1 comprises the following functional components: communication history receiver (communication history receiving means) 101, traffic information generator (traffic information generating means) 102, dissatisfaction calculator (dissatisfaction calculating means) 103, recommended action extractor (recommended action extracting means) 104, information transmitter (information transmitting means) 105, action specifier (action specifying means) 106, function resetter (function resetting means) 107, communication history storage 108, dissatisfaction function storage 109, and recommended action storage 110. Each of the components will be described below in detail.

The communication history receiver 101 receives from the base station 3, communication history information being history information of communication of a plurality of mobile communication terminals including the mobile communication terminal 2 in the communication network 5 and stores the communication history information into the communication history storage 108. Here the base station 3 has a function of retaining histories of communications of mobile communication terminals via the base station 3. More specifically, when the plurality of mobile communication terminals transmit a connection request to the communication network 5, to the base station 3, the base station 3 transmits the communication history information to the user guidance system 1. Upon disconnection between the plurality of mobile communication terminals and the communication network 5, the communication history information is also transmitted in an updated state from the base station 3 to the user guidance system 1. The communication history receiver 101 also receives the communication history information in the same manner from the other base stations than the base station 3 in the communication network 5.

FIG. 2 shows an example of a data configuration stored in the communication history storage 108. As shown in the same figure, the communication history storage 108 stores the following data in association with each other: user ID "0000001" to identify the mobile communication terminal 2; originating time "200501171402" being a time when the mobile communication terminal 2 transmitted a connection request; originating-time state "OK" to indicate whether a connection was established at the originating time; originating-time place "area002" to indicate a place of the mobile communication terminal 2 at the originating time; terminating time "200501171406" to indicate a time when the communication at the mobile communication terminal 2 was terminated; terminating-time state "NG" to indicate whether the connection was normally disconnected at the terminating time; terminating-time place "area001" to indicate a place of the mobile communication terminal 2 at the terminating time; communicating means "phone" to indicate a communicating means at the mobile communication terminal 2; information content of recommended action "none" transmitted from the user guidance system 1 upon the connection request of the mobile communication terminal 2. The "information content of recommended action transmitted from the user guidance system 1" contained in the communication history information may be stored in such a manner that the base station 3 monitors information transmitted and received between the user guidance system 1 and mobile communication terminal 2 and retains it as the communication history information or in such a manner that the communication history receiver 101 monitors information of the recommended action transmitted from the information transmitter 105 and adds it into associated communication history information in the communication history storage 108.

The traffic information generator 102 receives from a plurality of base stations including the base station 3, resource state information indicating a usage state of resources of the base station 3, such as system resources and communication resources, on a regular or as-needed basis. Examples of this resource state information include a usage rate of radio channels available for communications with mobile communication terminals at the base station 3, a usage rate of a CPU (Central Processing Unit) at the base station 3, and so on. The traffic information generator 102 reads the communication history information out of the communication history storage 108 and generates communication traffic information about the communication traffic at the base station 3, with reference to the communication history information and the resource state information.

For example, the traffic information generator 102 is configured as follows: it extracts from the communication history information every information having the "originating time" within a predetermined time from the present time and the "originating-time place" within a coverage area of the base station, and counts the "number of originating calls" at the base station 3; it tallies "originating-time states" in the extracted communication history information and obtains the "number of blocked calls $B_{P1}$"; it tallies the presence/absence of "information content of recommended action" in the extracted communication history information and obtains the "number of transmissions of recommended action $I_P$"; it extracts from the communication history information every information having the "terminating time" within a predetermined time from the present time and the "terminating-time place" within a coverage of the base station, and tallies the "terminating-time states" in the communication history information to determine the "number of occurrences of forced termination $D_{P1}$."

Furthermore, the traffic information generator 102 also estimates "blocking probability $B_{P2}$" and "forced termination probability $D_{P2}$" at the present base station 3 from the resource information of the base station 3. More specifically, it calculates the "blocking probability $B_{P2}$" and "forced termination probability $D_{P2}$," using such parameters as the usage rate of radio channels and the usage rate of CPU at the base station 3, and the number of radio channels at the base station 3. The traffic information generator 102 outputs to the dissatisfaction calculator 103 the communication traffic information generated about the plurality of base stations and the communication history information read out of the communication history storage 108.

The dissatisfaction calculator 103 calculates a dissatisfaction with an action recommended to the user of the mobile communication terminal 2, based on the communication traffic information and communication history information received from the traffic information generator 102. The recommended action information indicating the action recommended to the user of the mobile communication terminal 2 is transferred from the recommended action extractor 104 (the details of which will be described later), and the dissatisfaction calculated as to the recommended action information is returned to the recommended action extractor 104.

Namely, the dissatisfaction calculator 103 references the dissatisfaction function storage 109 to specify a dissatisfaction function for calculation of dissatisfaction. The dissatisfaction function specified herein by the dissatisfaction calculator 103 is given by Formula (1) below.

$$a \times B_{P2} + b \times D_{P2} + c \times I_P + d \times M_P + e \times W_P + f \times C_P \quad (1)$$

In Formula (1), $B_{P2}$ represents the blocking probability, $D_{P2}$ the forced termination probability, $I_P$ the number of transmissions of recommended action, $M_P$ a moving distance according to guidance, $W_P$ a waiting time according to guidance, and $C_P$ the number of changes of communication means according to guidance. Where the dissatisfaction is calculated from past communication histories, the number of blocked calls $B_{P1}$ and the number of occurrences of forced termination $D_{P1}$ may be used instead of the blocking probability $B_{P2}$ and the forced termination probability $D_{P2}$ in Formula (1) above. In this dissatisfaction function, the dissatisfaction of the user is expressed by the sum of values proportional to the numbers of occurrences, occurrence probabilities, and/or amounts of events, using parameters about the events to cause user's dissatisfaction, such as call loss and forced termination. The dissatisfaction calculator 103 reads the coefficients a-f in the above Formula (1) out of the dissatisfaction function storage 109, specifies a dissatisfaction function, based on the coefficients, and thereafter calculates a dissatisfaction of the user with a recommended action by use of the dissatisfaction function. FIG. 3 shows an example of a configuration of data stored in the dissatisfaction function storage 109. As shown in the same figure, the dissatisfaction function storage 109 stores a user group "0001" to which the user of the mobile communication terminal 2 belongs, in association with the coefficients a-f, and the dissatisfaction calculator 103 references the dissatisfaction function storage 109, using the user group "0001" as a search key, to retrieve the coefficient a "100," coefficient b "100," coefficient c "10," coefficient d "1," coefficient e "1," and coefficient f "10."

Then the dissatisfaction calculator 103 calculates the dissatisfaction with the recommended action information by putting the blocking probability $B_{P2}$ and the forced termination probability $D_{P2}$ contained in the traffic information, and the parameters $I_P$, $M_P$, $W_P$, and $C_P$ derived from the communication history information and the recommended action information, into the above Formula (1).

Specifically, where the recommended action information is "movement to around X," the dissatisfaction calculator 103 calculates the dissatisfaction, using the blocking probability $B_{P2}$ and the forced termination probability $D_{P2}$ of a base station corresponding to a destination located area, the "moving distance $M_P$ according to guidance" and the "waiting time $W_P$ according to guidance" calculated from the "originating-time place" in the latest communication history or the latest originating-time place of mobile communication terminal 2 acquired from the base station 3 and from the recommended action, and the "number of transmissions of recommended action $I_P$" specified from the presence/absence of "information content of recommended action" in the communication histories. For example, in a case where the recommended action is "movement to around station Δ," the dissatisfaction calculator 103 determines the "moving distance $M_P$ according to guidance" from a distance between the originating-time place "area002" in the latest communication history (cf. FIG. 2) and the region "around station Δ," and determines the "waiting time $W_P$ according to guidance" from a moving time corresponding to the distance. Where the recommended action information is "waiting for time X," the waiting time corresponding to the recommended action is used as the "waiting time $W_P$ according to the guidance." Where the recommended action is "change of communication means to X," the calculator uses the "number of changes of communication means $C_P$ according to the guidance" corresponding to the recommended action.

The recommended action extractor 104 reads a plurality of candidates for recommended action information out of the recommended action storage 110 and extracts the recommended action information for the user of the mobile communication terminal 2 to be notified of, out of the candidates for the recommended action information, based on dissatisfactions calculated for the candidates for the recommended action information. Specifically, the recommended action extractor 104 reads a plurality of candidates for recommended action information out of the recommended action storage 110, outputs each of the candidates for the recommended action information to the dissatisfaction calculator 103, and receives dissatisfactions calculated for the candidates by the dissatisfaction calculator 103. FIG. 4 shows an example of a configuration of data stored in the recommended action storage 110. In the recommended action storage. 110, as shown in the same figure, the recommended action information "movement to around X" is in correspondence to candidates for parameter X "station ◯; station Δ; tower ☐; . . . " in the recommended action information. The recommended action extractor 104 reads all the recommended action information items and parameters X out of the recommended action storage 110, outputs the recommended action information replaced with each parameter X (e.g., "movement to around station ◯") to the dissatisfaction calculator 103, and receives a dissatisfaction calculated about each recommended action information from the dissatisfaction calculator 103. Then the recommended action extractor 104 extracts from the candidates for the recommended action information, one with a dissatisfaction not more than a predetermined threshold, a predetermined number of recommended actions selected in order from the smallest dissatisfaction, or the recommended action information with the minimum dissatisfaction, and outputs the selected information to the information transmitter 105.

When the recommended action extractor 104 selects the candidates for the recommended action information from the recommended action storage 110, it may preliminarily select candidates with small estimated dissatisfactions out of all the recommended action information items stored in the recommended action storage 110. This selection can be conducted according to one of the following determination methods: the extractor selects parameters within a predetermined range from the location of the user among the parameters X corresponding to the recommended action information "movement to around X," based on the "originating-time place" or "terminating-time place" included in the communication history of the mobile communication terminal 2 (cf. FIG. 2); the extractor estimates from the communication history, times when the radio channel usage rate of the base station where the user is located is low, and selects parameters X corresponding to the recommended action information "waiting for time X"; the extractor selects the recommended action information "change of communication means to X," based on the "communication means" included in the communication history, radio channel usage rates of surrounding base stations, and the communication traffic information $B_{P2}, D_{P2}$.

The information transmitter 105 transmits the recommended action information extracted by the recommended action extractor 104, to the mobile communication terminal 2. The information transmitter 105 outputs the recommended action information transmitted to the mobile communication terminal 2, to the action specifier 106.

The action specifier 106 specifies an action of the user of the mobile communication terminal 2 after the transmission of the recommended action by the information transmitter 105. More specifically, after the recommended action information is outputted from the information transmitter 105, the action specifier 106 references the communication history about the mobile communication terminal 2 stored in the communication history storage 108 to specify the action of the user to the guidance of the user guidance system 1. For example, it specifies a destination of movement, waiting time, and communication means of the user from the latest communication history information containing the user ID "0000001." The action specifier 106 outputs the information about the action of the user specified, to the function resetter 107.

The function resetter 107 determines whether the information about the action of the user of the mobile communication terminal 2 received from the action specifier 106 agrees with the recommended action information transmitted to the mobile communication terminal 2. For example, the function resetter 107 determines whether the destination or communication means of the user being the information about the action of the user is equivalent to the parameter X in the recommended action information "movement to around X" or "change of communication means to X," or whether a difference between the waiting time of the user being the information about the action of the user and the parameter X in the recommended action information "waiting for time X" is within an allowable range. When the result of the determination is that the action of the user does not agree with the recommended action, the function resetter 107 resets the coefficients a-f stored in the dissatisfaction function storage 109. Specifically, in a case where the recommended action information is "movement to around X" and where the action of the user does not agree with the recommended action, the dissatisfaction of the user with the movement is considered to be significant, and thus the function resetter 107 increases the coefficient d corresponding to the distance $M_P$ of movement according to the guidance. In another case where the recommended action information is "waiting for time X" and where the waiting time of the user is shorter than the "time X," the dissatisfaction of the user with the waiting is considered to be significant, and the function resetter 107 increases the coefficient e corresponding to the time $W_p$ for waiting according to the guidance. In another case where the recommended action information is "waiting for time X" and where the waiting time of the user is longer than the "time X," the dissatisfaction of the user with the waiting is considered to be not so significant, and the function resetter 107 decreases the coefficient e corresponding to the time $W_P$ for waiting according to the guidance. Furthermore, in a case where the recommended action information is "change of communication means to X," the dissatisfaction of the user with the change of communication means is considered to be significant, and the function resetter 107 increases the coefficient f corresponding to the number of changes of communication means $C_P$ according to the guidance.

Figure 5:
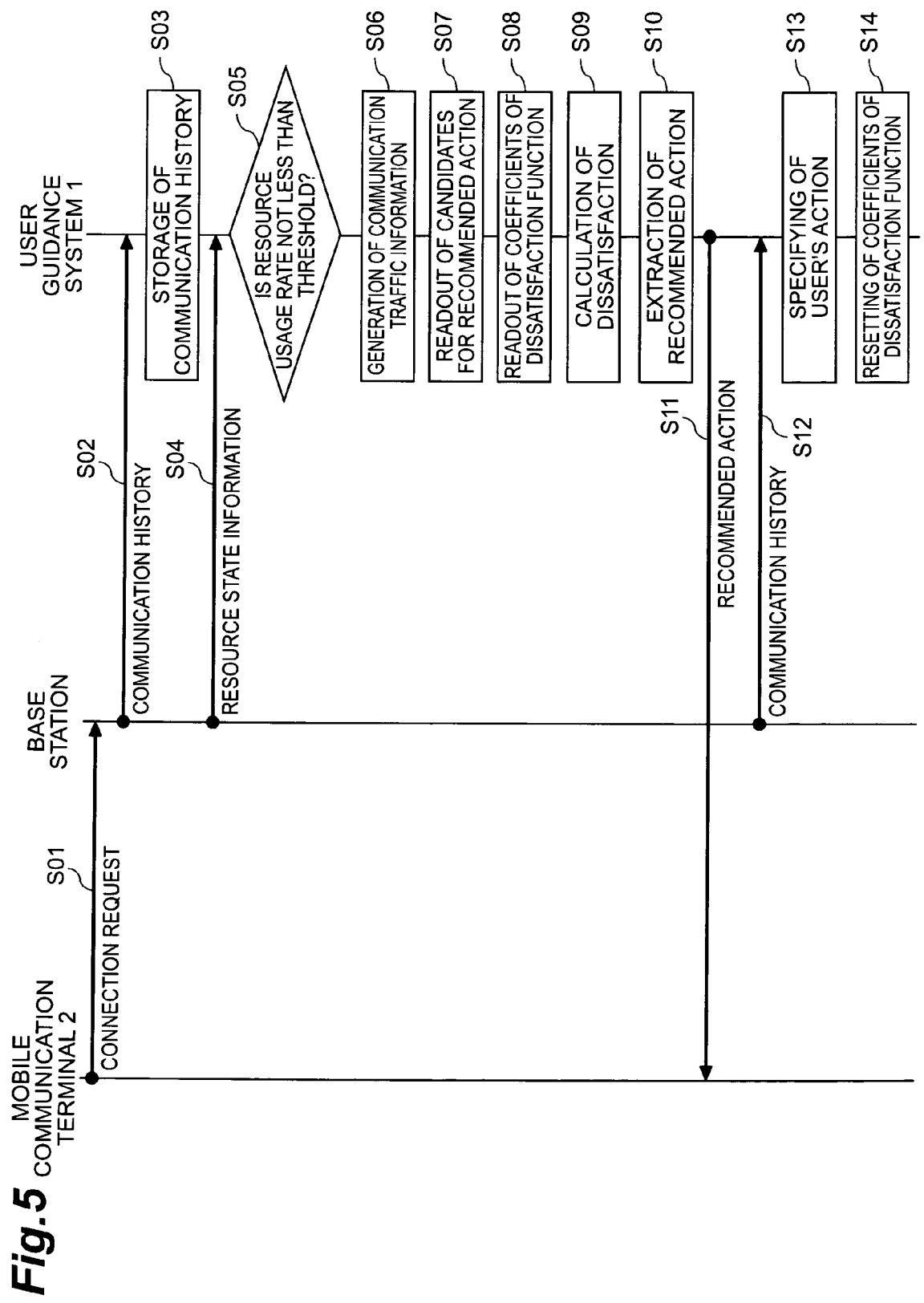
FIG. 5 is a diagram showing an operation of the user guidance system in FIG. 1.

The operation of the user guidance system 1 will be described below with reference to FIG. 5, while detailing a user guidance method in the user guidance system 1.

First, the mobile communication terminal 2 transmits a connection request for connection to the communication network 5, to a base station 3 (step S01). Next, the base station 3 generates the communication history information corresponding to the connection request and transmits the generated communication history information to the user guidance system 1 (step S02). In response thereto, the communication history receiver 101 of the user guidance system 1 stores the communication history information received from the base station 3, into the communication history storage 108 (step S03). At the same time as it, the traffic information generator 102 receives from the base station 3 the resource state information indicating a usage state of resources at the base station 3 (step S04).

After that, the user guidance system 1 determines whether the resource usage rate of the base station 3 where the mobile communication terminal 2 is located, exceeds a threshold. When the resource usage rate exceeds the threshold, the processing is transferred to step S06. When the resource usage rate does not exceed the threshold, the transmission processing of recommended action to the mobile communication terminal 2 is suspended (the operation heretofore is step S05). Next, the traffic information generator 102 generates the communication traffic information about the base station 3 by making use of the communication history information and the resource state information (step S06). Furthermore, the recommended action extractor 104 references the recommended action storage 110 to select a plurality of candidates for recommended action information (step S07). Then the dissatisfaction calculator 103 reads the coefficients a-f out of the dissatisfaction function storage 109 to specify the dissatisfaction function (step S08). Thereafter, the dissatisfaction calculator 103 makes use of the dissatisfaction function to calculate a dissatisfaction of the user of the mobile communication terminal 2 about each of the candidates for the recommended action information (step S09). The recommended action extractor 104 extracts a recommended action to be transmitted to the mobile communication terminal 2, out of the candidates for the recommended action information, based on the dissatisfactions calculated as described above (step S10). Then the information transmitter 105 transmits the extracted recommended action to the mobile communication terminal 2 (step S11).

Thereafter, at the timing of transmission of another connection request from the mobile communication terminal 2, at the timing of termination of communication, or at the timing of transmission of the recommended action, the base station 3 updates the communication history information and transmits it to the user guidance system 1 (step S12). The action specifier 106 specifies an action of the user of the mobile communication terminal immediately after the information transmitter 105 has transmitted the recommended action information to the mobile communication terminal 2 (step S13). In response thereto, the function resetter 107 updates the coefficients a-f stored in the dissatisfaction function storage 109 if the information about the action of the user of the mobile communication terminal 2 specified by the action specifier 106 does not agree with the recommended action information transmitted to the mobile communication terminal 2 (step S14).

The user guidance system 1 described above is configured to receive the communication history of the mobile communication terminal 2 and the usage states of resources of a plurality of base stations including the base station 3, to generate the information about the communication traffic at the base stations from these information pieces, and to calculate dissatisfactions with respective actions recommended to the user, based on the communication history, the usage states of resources of the base stations, and the communication traffics of the base stations. Since the recommended action suitable for the user is extracted out of the plurality of actions on the basis of the calculated dissatisfactions and the user is notified of it, the recommended action suitable for the user can be selected out of the plurality of candidates, in consideration of the traffic states at the respective base stations and the communication state at the user. This permits the system to guide the user requesting a connection during congestion of communication, to an appropriate action and to suppress an unnecessary connection request in conjunction with dissatisfaction of the user. As a result, it is feasible to realize efficient utilization of communication resources. Since the dissatisfaction function is reset based on the actual action of the user to the guidance, the system is able to present a recommended action matching an actual communication mode of each individual user.

Figure 6:
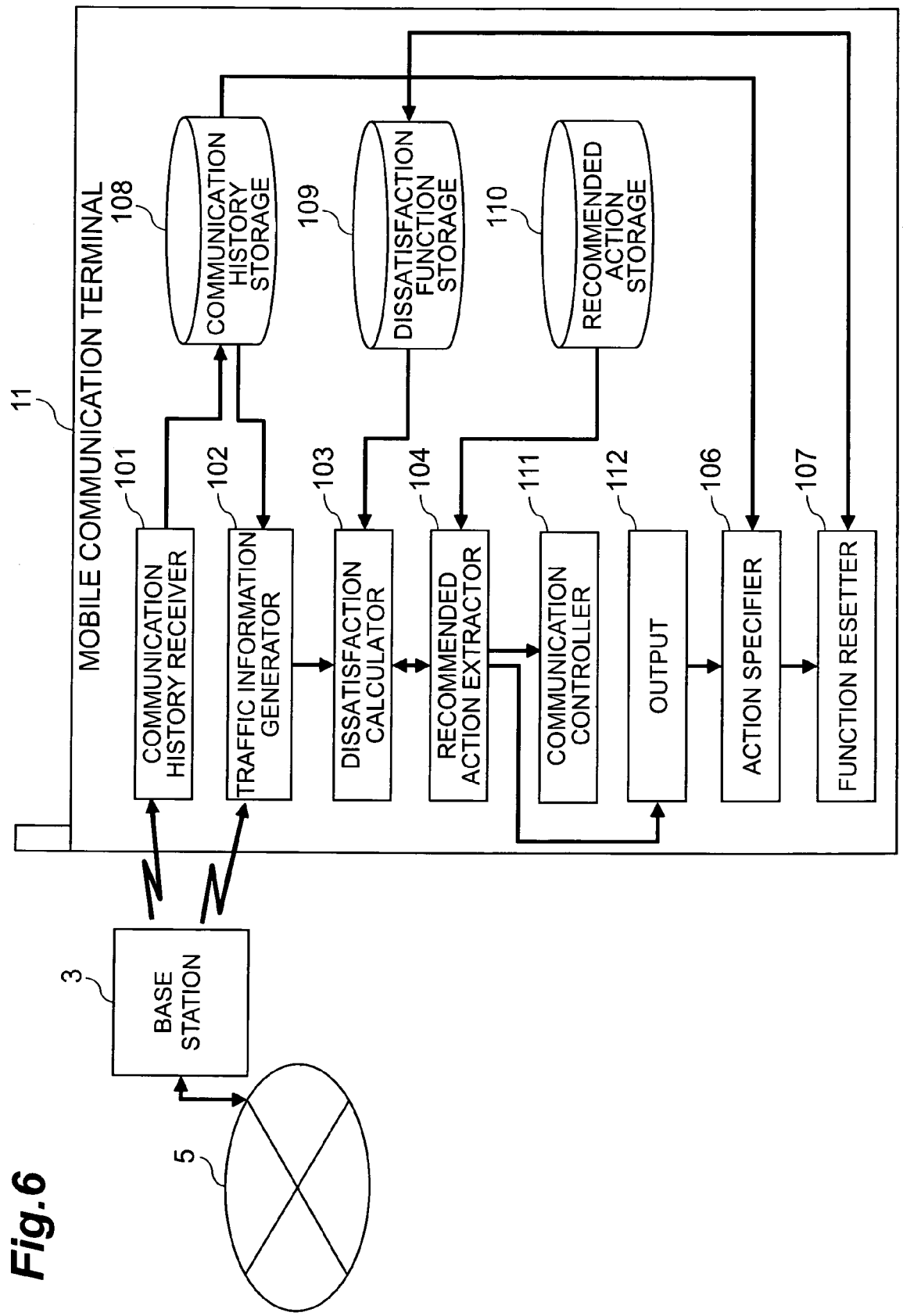
FIG. 6 is a schematic configuration diagram showing a mobile communication terminal as another embodiment of the present invention.

The present invention is by no means limited to each of the above embodiments. For example, the mobile communication terminal may be equipped with the functions implemented in the user guidance system 1. FIG. 6 is a schematic configuration diagram showing a mobile communication terminal 11 as another embodiment of the present invention. As shown in the same figure, the mobile communication terminal 11 comprises the following functional components: communication history receiver 101, traffic information generator 102, dissatisfaction calculator 103, recommended action extractor 104, action specifier 106, function resetter 107, communication history storage 108, dissatisfaction function storage 109, and recommended action storage 110; and communication controller 111 and output unit 112. Only the components different from those in the user guidance system 1 will be described below.

The output unit 112 outputs the recommended action information extracted by the recommended action extractor 104, to an information outputting means (not shown) such as a display or microphone in the mobile communication terminal 11.

The communication controller 111 controls the communication function in the mobile communication terminal 11 so as to limit the connection from the mobile communication terminal 11 to the communication network 5, according to the recommended action information extracted by the recommended action extractor 104. Specifically, where the recommended action information is "movement to around X," the communication controller 111 restricts the connection request function in the mobile communication terminal 11 during a period before the location of the mobile communication terminal 11 read from the communication history information about the mobile communication terminal 11 agrees with the parameter X. Where the recommended action information is "waiting for time X," the communication controller 111 restricts the connection request function in the mobile communication terminal 11 for the time corresponding to the parameter X. Furthermore, where the recommended action information is "change of communication means to X," the communication controller 111 restricts the connection request function by the communication means other than the communication means corresponding to the parameter X. This enables communication control suitable for the recommended action on the mobile communication terminal side and promotes more effective utilization of communication resources.

The mobile communication terminal 11 may be configured to acquire the information necessary for the calculation of dissatisfaction, i.e., the communication history information, dissatisfaction function and coefficients thereof, and candidates for recommended action information from the communication network 5 side, instead of preliminarily retaining them in the data storage means such as memories, and may be configured to acquire an algorithm for generating the traffic information about the base station from the communication network 5 side. The terminal may also operate to generate the communication history information within the mobile communication terminal 11.

Preferably, the dissatisfaction calculating means calculates the dissatisfaction, using a function preliminarily set based on the communication history information and communication traffic information, and the terminal further comprises action specifying means for specifying an action of the user after the transmission of the recommended action to the mobile communication terminal by the information transmitting means, based on the communication history information; and function resetting means for resetting the function if the action specified by the action specifying means is different from the recommended action. This configuration permits the terminal to grasp the actual action of the user to the recommended action presented to the user, and calculate the dissatisfaction, based thereon, and thereby to present a better recommended action to the user.

The aforementioned mobile communication terminal preferably further comprises communication controlling means for restricting the connection to the communication network, according to the recommended action extracted by the recommended action extracting means. In this case, the communication control suitable for the recommended action is performed on the terminal side, whereby it is feasible to promote more effective utilization of communication resources.

INDUSTRIAL APPLICABILITY

The present invention is applicable to usage of the user guidance system, mobile communication terminal, and user guidance method for guiding the user's action during utilization of communication, so as to guide the user to an appropriate action during utilization of communication.

The invention claimed is:

1. A user guidance system comprising:
   communication history receiving means for receiving communication history information which is history information of communication of a mobile communication terminal in a communication network;
   traffic information generating means for receiving from a base station in the communication network, resource state information indicating a usage state of resources of the base station and for generating communication traffic information about a communication traffic at the base station, using the resource state information and the communication history information;
   dissatisfaction calculating means for calculating a dissatisfaction with a recommended action being an action recommended to a user of the mobile communication terminal, based on the communication history information received by the communication history receiving means and the communication traffic information generated by the traffic information generating means;
   recommended action extracting means for, based on dissatisfactions with a plurality of recommended actions calculated by the dissatisfaction calculating means, extracting a recommended action for the user to be notified of, out of the plurality of recommended actions; and
   information transmitting means for transmitting the recommended action extracted by the recommended action extracting means, to the mobile communication terminal.

2. The user guidance system according to claim 1, wherein the dissatisfaction calculating means calculates the dissatisfaction, using a function preliminarily set based on the communication history information and communication traffic information,
   the user guidance system further comprising:
   action specifying means for specifying an action of the user after the transmission of the recommended action to the mobile communication terminal by the information transmitting means, based on the communication history information; and
   function resetting means for resetting the function if the action specified by the action specifying means is different from the recommended action.

3. A mobile communication terminal comprising:
   communication history receiving means for receiving communication history information being history information of communication in a communication network;
   traffic information generating means for receiving from a base station in the communication network, resource state information indicating a usage state of resources of the base station and for generating communication traffic information about a communication traffic at the base station, using the resource state information and the communication history information;
   dissatisfaction calculating means for calculating a dissatisfaction with a recommended action being an action recommended to a user, based on the communication history information received by the communication history receiving means and the communication traffic information generated by the traffic information generating means;
   recommended action extracting means for, based on dissatisfactions with a plurality of recommended actions calculated by the dissatisfaction calculating means, extracting a recommended action for the user to be notified of, out of the plurality of recommended actions; and
   outputting means for outputting the recommended action extracted by the recommended action extracting means.

4. The mobile communication terminal according to claim 3, wherein the dissatisfaction calculating means calculates the dissatisfaction, using a function preliminarily set based on the communication history information and communication traffic information,
   the mobile communication terminal further comprising:
   action specifying means for specifying an action of the user after the transmission of the recommended action to the mobile communication terminal by the information transmitting means, based on the communication history information; and
   function resetting means for resetting the function if the action specified by the action specifying means is different from the recommended action.

5. The mobile communication terminal according to claim 3, further comprising communication controlling means for restricting connection to the communication network, according to the recommended action extracted by the recommended action extracting means.

6. A user guidance method comprising:
   a communication history receiving step wherein communication history receiving means receives communication history information being history information of communication in a communication network;
   a traffic information generating step wherein traffic information generating means receives from a base station in the communication network, resource state information indicating a usage state of resources of the base station and generates communication traffic information about a communication traffic at the base station, using the resource state information and the communication history information;
   a dissatisfaction calculating step wherein dissatisfaction calculating means calculates a dissatisfaction with a recommended action being an action recommended to a user, based on the communication history information received by the communication history receiving means and the communication traffic information generated by the traffic information generating means; and
   a recommended action extracting step wherein, based on dissatisfactions with a plurality of recommended actions calculated by the dissatisfaction calculating means, recommended action extracting means extracts a recommended action for the user to be notified of, out of the plurality of recommended actions.

7. The mobile communication terminal according to claim 4, further comprising communication controlling means for restricting connection to the communication network, according to the recommended action extracted by the recommended action extracting means.

8. The user guidance system according to claim 1, wherein the traffic generating means generates the communication traffic information about the communication traffic at the base station using information corresponding to a number of calls originated at the base station.

9. The mobile communication terminal according to claim 3, wherein the received resource state information includes information indicating a number of calls originated at the base station, and the traffic generating means generates the communication traffic information about the communication traffic at the base station using the information indicating the number of calls originated at the base station.

10. The user guidance method according to claim 6, wherein the traffic information generating step generates the communication traffic information about the communication traffic at the base station using information corresponding to a number of calls originated at the base station.

11. The user guidance system according to claim 1, wherein the traffic generating means generates the communication traffic information about the communication traffic at the base station using information corresponding to a number of calls blocked at the base station.

12. The mobile communication terminal according to claim 3, wherein the received resource state information includes information indicating a number of calls blocked at the base station, and the traffic generating means generates the communication traffic information about the communication traffic at the base station using the number of calls blocked at the base station.

13. The user guidance method according to claim 6, wherein the traffic information generating step generates the communication traffic information about the communication traffic at the base station using information corresponding to a number of calls blocked at the base station.

14. The user guidance system according to claim 1, wherein the traffic generating means generates the communication traffic information about the communication traffic at the base station using information corresponding to a number of occurrences of forced call termination at the base station.

15. The mobile communication terminal according to claim 3, wherein the received resource state information includes information indicating a number of occurrences of forced call termination at the base station, and the traffic generating means generates the communication traffic information about the communication traffic at the base station using the number of occurrences of forced call termination at the base station.

16. The user guidance method according to claim 6, wherein the traffic information generating step generates the communication traffic information about the communication traffic at the base station using information corresponding to a number of occurrences of forced call termination at the base station.

17. The user guidance system according to claim 1, wherein the dissatisfaction calculating means calculates the dissatisfaction with the recommended action based on a waiting time corresponding to the recommended action and a moving distance in corresponding to the recommended action.

18. The mobile communication terminal according to claim 3, wherein the dissatisfaction calculating means calculates the dissatisfaction with the recommended action based on a waiting time corresponding to the recommended action and a moving distance corresponding to the recommended action.

19. The user guidance method according to claim 6, wherein the dissatisfaction calculating step includes calculating the dissatisfaction with the recommended action based on a waiting time corresponding to the recommended action and a moving distance corresponding to the recommended action.

* * * * *

UNITED STATES PATENT AND TRADEMARK OFFICE
CERTIFICATE OF CORRECTION

| | | |
|---|---|---|
| PATENT NO. | : 7,689,243 B2 | Page 1 of 1 |
| APPLICATION NO. | : 10/586640 | |
| DATED | : March 30, 2010 | |
| INVENTOR(S) | : Kaneda et al. | |

It is certified that error appears in the above-identified patent and that said Letters Patent is hereby corrected as shown below:

On the title page, Item (86), the PCT information is incorrect. Item (86) should read:
-- (86) PCT No.:  PCT/2006/303845

§371 (c)(1),
(2), (4) Date: Mar. 1, 2006 --

Signed and Sealed this

Twenty-fifth Day of May, 2010

David J. Kappos
*Director of the United States Patent and Trademark Office*